Figure 1:
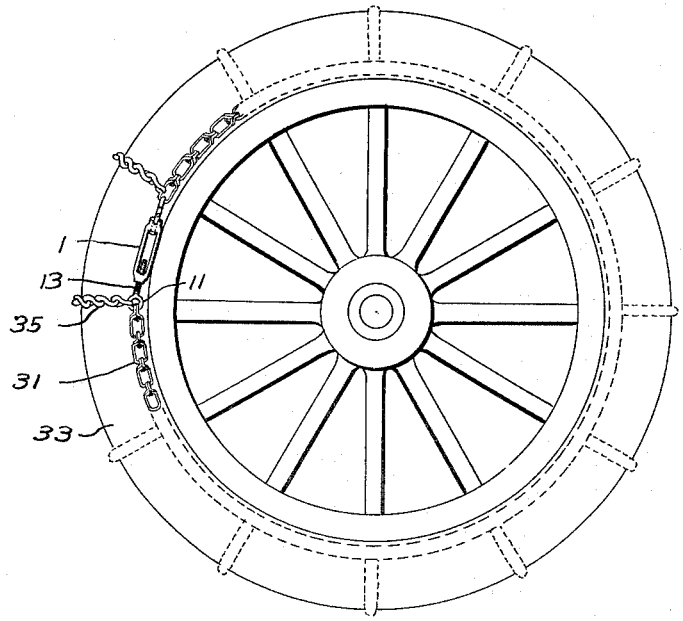

C. S. BARRELL.
SWIVEL TURNBUCKLE DEVICE.
APPLICATION FILED MAY 11, 1920.

1,374,348.

Patented Apr. 12, 1921.

Inventor:
Charles H. Barrell
by Robt. P. Harris,
Attorney

UNITED STATES PATENT OFFICE.

CHARLES S. BARRELL, OF BOSTON, MASSACHUSETTS.

SWIVEL-TURNBUCKLE DEVICE.

1,374,348.      Specification of Letters Patent.      Patented Apr. 12, 1921.

Application filed May 11, 1920. Serial No. 380,693.

*To all whom it may concern:*

Be it known that I, CHARLES S. BARRELL, a citizen of the United States, residing at Boston, in the county of Suffolk and State of Massachusetts, have invented an Improvement in Swivel-Turnbuckle Devices, of which the following description, in connection with the accompanying drawings, is a specification, like characters on the drawings representing like parts.

The invention to be hereinafter described relates to swivel-turn-buckle devices for tire chains and other purposes.

A well known form of tire chain or armor for vehicle tires comprises circular side chains adapted to be placed at opposite sides of the tire a substantial distance in from the tread thereof, said circular side chains being connected at intervals by cross tread members or chains extending transversely across the tread of the tire. It is desirable to provide means for connecting the terminals of each of the circular side chains, so that said terminals may be readily connected and drawn toward each other properly to secure the tire chain or armor onto the tire.

In use, it is necessary frequently to apply the tire chain or armor to the tire and remove the same therefrom, and the cross chains experience hard usage and become worn, so that it is necessary to release the tire chain or armor and substitute new cross chains for worn ones. These conditions make it desirable that means shall be provided for quickly connecting the terminals of the circular side chains of the armor, and for quickly drawing the terminals toward each other properly to secure the armor on the tire. The traction effect on the armor is such that the chains are subjected to severe strains and vibration. Therefore, it is desirable that the means connecting the terminals of the circular side chains shall be provided with locking means which will automatically hold the circular side chains in their positions of adjustment.

The aim and purpose of the present invention, therefore, is to provide simple and efficient means for connecting and adjusting the terminals of the circular side chains as required. Since it is necessary frequently to apply the armor quickly to the tire, it is desirable that this may be accomplished with as few operations as possible. It is, therefore, desirable that after the connecting means has been adjusted, it shall automatically be locked without further attention on the part of the user. The connecting means, in the present instance of the invention, is in the form of a swivel turnbuckle device which may be manually adjusted properly to position the circular side chains of the armor, and the character of the locking device is such that it will automatically hold the turn-buckle in its position of rotative adjustment without requiring manual operation of the locking device. In the present form of the invention, the locking device is provided with a resilient element which tends constantly to hold the locking device in position to prevent rotation of the turn-buckle when the armor is in use on the tire. Thus, the device is well adapted to withstand the strains and vibration which tire armor necessarily experiences, without loss of the proper adjustment of the circular side chains. While the swivel turn-buckle device has been illustrated and described more particularly in its use in a tire chain or armor, it will be understood that it is susceptible of other uses.

The character of the invention will be best understood by reference to the following description of one good form thereof shown in the accompanying drawing, wherein:—

Figure 2:
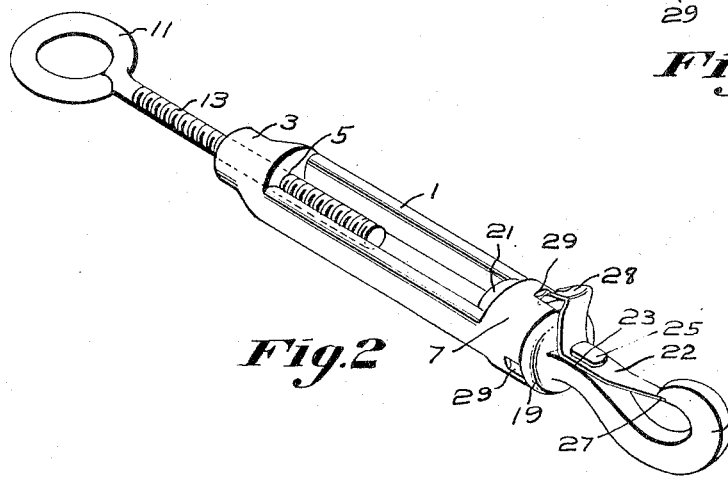

Figure 1 is a side view of a wheel having a tire provided with an armor or chain equipped with a turn-buckle device embodying the invention;

Fig. 2 on an enlarged scale is a perspective view of the device; and

Figure 3:
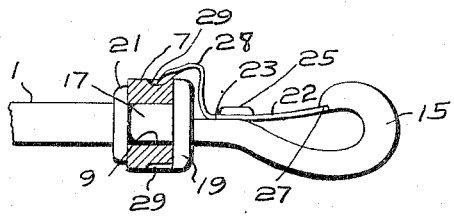

Fig. 3 is a side view of the snap hook swivel member and a sectional view of a portion of the nut member.

Referring to the drawing, the device shown therein for purposes of illustration as embodying the invention, comprises a nut member 1 having a terminal 3 provided with a threaded eye 5, and a terminal 7 provided with a swivel eye 9.

An attaching element, in the present instance of the invention, in the form of an eye 11 has a shank or shaft 13 threaded in the eye 5, the construction being such that on rotation of the nut 1 the threaded eye 5 will move along the shank 13 toward or from the eye 11 depending on the direction of rotative adjustment of the nut.

A swived attaching element, in the present instance of the invention, in the form of a snap hook 15 has a shaft 17 rotatably mounted in the swivel eye 9 of the nut, said shaft being confined against movement in the direction of the axis thereof by a head or flange 19 for engagement with one end of the terminal 7 of the nut, and a head 21 for engagement with the opposite end of said terminal. The latter head may be produced by upsetting the end of the shaft 17 after the latter has been inserted in the eye 9, and the shaft 17 and head 19 are preferably formed integral with the hook 15.

The snap hook 15 may be provided with suitable means for closing the same, in the present instance, in the form of a spring tongue 21 having an aperture 23 therein fitted over a stud 25 projecting outward from the shank of the hook and upset firmly to secure said tongue thereto. The tip of the tongue may normally fit in a seat 27 in the end of the hook. This tongue may be pressed downward away from said seat to admit a link into the hook, and thereupon, the inherent resilience of the tongue will cause the same to snap back into the seat and prevent escape of the link from the hook.

In adjusting the nut with respect to the threaded shank of the eye 11, the terminal 7 of the nut may readily rotate on the swivel shaft of the snap hook. It is important that after the nut has been adjusted as desired, that the nut and the swivel hook shall be locked against relative rotation. Suitable means may be provided for this purpose, in the present instance of the invention, comprising a detent 28 which may conveniently be in the form of a continuation of the tongue 21. This detent is adapted to coöperate with one or more indentations or notches 29, in the present instance, three being shown in the periphery of the nut terminal 7. The construction is such that on rotation of the nut with respect to the swivel hook, the indentations 29 will slick past the detent 28, and the completion of the rotative adjustment may be such that one of the indentations will register with the detent. Thereupon, the inherent resilience will cause the latter to snap into the indentations and securely lock the nut and the snap hook against relative rotation.

As stated, one important use of the swivel-turn-buckle device described is for connecting the terminals of the circular side chain of a tire chain. Referring to Fig. 1 of the drawing, a tire chain or armor is shown therein comprising circular side chains 31 adapted to be placed at opposite sides of a tire 33 a substantial distance radially inward from the tread of the tire, said circular side chains being connected at intervals by tread members or cross chains 35 extending transversely across the tread of the tire. The swivel-turn-buckle device is shown connected to the terminals of one of the circular side chains, the eye 11 being secured to one of the terminals, and the snap hook 15 being connected to the other terminal.

The construction is such that after the armor has been laid on the tire, the snap hook may be quickly and easily connected to one of the terminal links of the side chain, and then the nut of the turn-buckle chain may be rotated to draw the eye 11 toward the snap hook 15 to give the circular side chain the proper adjustment. The rotation of the turn-buckle nut may be arrested, so that one of the indentations 29 will register with the detent 28 which will automatically snap into the indentation, and securely lock the nut and swivel hook against relative rotation.

It will be understood that the invention is not limited to the specific embodiment shown, and that various deviations may be made therefrom without departing from the spirit and scope of the appended claims.

What is claimed is:—

1. A swivel-turn-buckle device for tire chains and other purposes, comprising a nut member having a swivel eye and a threaded eye, an eye member having a shank threaded in the threaded eye of said nut member, and a snap hook having a shank swiveled in the swivel eye of said nut member, said snap hook and nut member having interengaging locking elements automatically to lock said nut member in different positions of rotative adjustment in respect to said hook member.

2. A swivel-turn-buckle device for tire chains and other purposes, comprising a nut member having a swivel eye and a threaded eye, an attaching element having a shaft threaded in the threaded eye of said nut member, a swivel attaching element having a shaft rotatably mounted in the swivel eye of said nut member, the nut member and swivel attaching element having a spring detent on one and an indentation on the other for engagement to yieldably lock the nut member and swivel attaching element against relative rotation.

3. A swivel-turn-buckle device for tire chains and other purposes, comprising a nut member having a swivel eye and a threaded eye, an attaching element having a shaft threaded in the threaded eye of said nut member, a swivel element having a shaft rotatably mounted in the swivel eye of said nut member, and means coöperating with the nut member and swivel attaching element to lock the same against relative rotation.

4. A swivel-turn-buckle device for tire chains and other purposes, comprising a nut member having a swivel eye and a threaded eye, an eye member having a shank threaded in the threaded eye of said nut member, a swivel snap hook having a shaft rotatably mounted in the swivel eye of said nut member, and means automatically to lock the nut member and swivel hook against relative rotation.

5. A swivel-turn-buckle device for tire chains and other purposes, comprising a nut member having a swivel eye and a threaded eye, an attaching element having a shaft threaded in the threaded eye of said nut member, a swivel snap hook having a shaft rotatably mounted in the swivel eye of said nut member, and a spring member secured to said swivel hook having a tongue for closing said hook and a detent for locking engagement with the nut member.

6. A swivel turn-buckle device for tire chains and other purposes, comprising a nut member having a swivel eye and a threaded eye, an attaching element having a shaft threaded in the threaded eye of the nut member, a swivel attaching element having a shaft rotatably mounted in the swivel eye of the nut member, and means to yieldingly lock the nut member to the swivel attaching element in different predetermined positions of angular adjustment.

In testimony whereof I have signed my name to this specification.

CHARLES S. BARRELL.